United States Patent [19]

Grode et al.

[11] 4,112,989

[45] Sep. 12, 1978

[54] FLEXIBLE COLLAPSIBLE BLOOD FREEZING CONTAINERS

[75] Inventors: Gerald Arthur Grode, Grayslake; Daniel Roy Boggs, Round Lake Park; James Irvin Wright, Mundelein, all of Ill.

[73] Assignee: Baxter Travenol Laboratories, Inc., Deerfield, Ill.

[21] Appl. No.: 629,347

[22] Filed: Nov. 6, 1975

[51] Int. Cl.² .............................................. A61M 5/14
[52] U.S. Cl. .................................... 150/1; 128/214 D; 428/35
[58] Field of Search ................... 150/1, 8; 128/214 D; 428/35; 526/331

[56] References Cited

U.S. PATENT DOCUMENTS

| 3,244,680 | 4/1966 | Holladay et al. | 526/331 |
| 3,399,250 | 8/1968 | Kirk et al. | 260/997 |
| 3,483,023 | 12/1969 | Dolson | 117/122 |
| 3,554,256 | 1/1971 | Anderson | 150/1 |
| 3,708,110 | 1/1973 | Unger et al. | 150/1 |
| 3,796,696 | 3/1974 | Brown | 526/331 |
| 3,810,503 | 5/1974 | Lewis, Jr. et al. | 150/1 |
| 3,915,212 | 10/1975 | Bujan et al. | 150/8 |

OTHER PUBLICATIONS

Brydson, J. A. "Plastics Materials", Newnes-Butterworths pp. 239–242, Third edition 1975.

Primary Examiner—William R. Dixon, Jr.
Attorney, Agent, or Firm—Henry W. Collins; Paul C. Flattery; Garrettson Ellis

[57] ABSTRACT

Improved, flexible, collapsible containers are provided for the storage of frozen blood and the like at cryogenic temperatures. The containers are defined by plastic walls consisting essentially of a biaxially-oriented ethylene-vinyl acetate copolymer containing from ten to thirty-five percent by weight of vinyl acetate units. The container wall thickness is typically from 0.01 to 0.025 inch.

5 Claims, 1 Drawing Figure

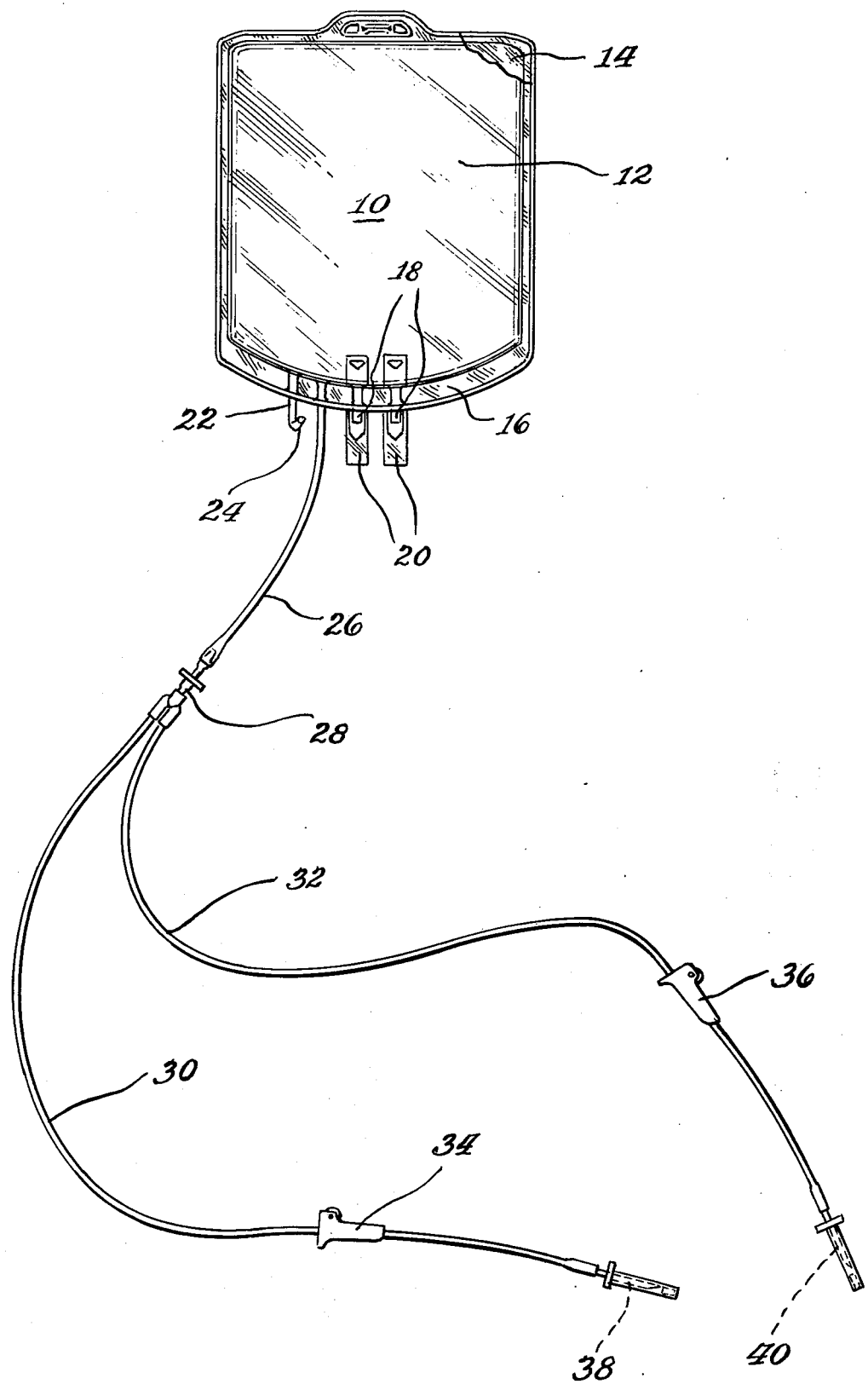

FLEXIBLE COLLAPSIBLE BLOOD FREEZING CONTAINERS

BACKGROUND OF THE INVENTION

The most advanced techniques of long-term blood cell preservation utilize freezing of the blood at cryogenic temperatures, for example around −195° C. by the use of liquid nitrogen, dry ice, or the like. A review of such techniques is available in an article entitled "Frozen Blood: Principles of Practical Preservation", p.p. 133-173, in Monographs in the Surgical Sciences Volume 3, No. 3, (Williams and Wilkins Co., 1956).

Preferably, the blood cells are stored in a flexible, collapsible container made of a blood-compatible plastic material. This permits the collapse of the bag for complete removal of the blood cells from the container with a minimum of suspending solution after freezing.

Currently, a blood cell freezing bag is sold by the Union Carbide Company, made of biaxially-oriented polyethylene with a wall thickness of about 0.002 to 0.004 inch. This container bag functions adequately at room temperature, when the blood cells are being placed into it or removed from it. However, it has exhibited an undue amount of weakness at cryogenic temperatures of about −195° C., so that upon rough handling the brittle plastic at this low temperature sometimes breaks. This of course usually spoils the blood cells, and prevents their use.

Furthermore, the polyethylene bag cannot be made by the desirable radio frequency (R.F.) sealing techniques for sealing the edges and ends of the bag together to provide a hermetically sealed container. Polyethylene is not effectively responsive to R.F. sealing, so less desirable heat sealing techniques must be used in the manufacture of the container, resulting in weaker seals.

While it would of course be desirable to increase the wall thickness of polyethylene freezing containers to approximately 0.008 to 0.01 inch, in order to increase the low temperature impact strength of the containers, this expedient is impractical, because such containers are excessively stiff, and do not collapse easily to permit the efficient removal of the blood cells from the bag.

Accordingly, the manufacturers of polyethylene cell freezing bags have been forced to accept a product which is undesirably fragile at low temperatures.

The blood cell freezing container of this invention provides a flexible, collapsible bag which has greatly increased impact strength at cryogenic temperatures, while retaining the good flexibility and collapsibility at room temperature for convenient processing of the blood cells. Furthermore, the collapsible container of this invention can be manufactured by the use of a convenient R.F. sealing process, as is conventionally used in the manufacture of polyvinyl chloride blood bags on a commercial basis, to produce the best available seal.

Accordingly, this superior product can stand rougher handling at cryogenic temperatures, while being capable of being effectively mass produced with R.F. sealing techniques.

DESCRIPTION OF THE INVENTION

In accordance with this invention, an improved. flexible, collapsible container is provided having improved physical strength at cryogenic temperatures. The container defines walls which consist essentially of a biaxiallyoriented ethylene-vinyl acetate copolymer containing from about ten to 35 percent by weight of vinyl acetate units, the balance being essentially ethylene units. The container defines a wall thickness of at least 0.005 inch and preferably from about 0.01 to 0.025 inch, yet remains flexible and collapsible at room temperature despite this increased wall thickness, unlike the containers of the prior art.

It is preferable for the ethylene-vinyl acetate copolymer film from which the container of this invention is made to be biaxially oriented by stretching during manufacture, in two generally perpendicular directions, for a distance sufficient to achieve at least a two-fold increase in dimension of the film in each said direction. The biaxial orientation of the plastic films is a well known technique, and serves to significantly strengthen the physical properties of the oriented film.

Preferably, the copolymer used in the containers of this invention contains from about fifteen to twenty-five percent by weight of vinyl acetate units, with the balance being ethylene units. Also, it is generally preferable for the wall thickness of the container of this invention to be from 0.012 to 0.018 inch in thickness, e.g. an average thickness of about 0.015 inch.

The FIGURE illustrates a plan view of a typical blood cell freezing bag of this invention, with a portion broken away for purposes of illustration.

Referring to the drawing, blood cell freezing bag 10 is shown, being made, in this present embodiment, from a pair of sheets 12, 14 of ethylene-vinyl acetate copolymer.

A specific material usable herein is a random copolymer containing 18 percent by weight of vinyl acetate units, with the balance being ethylene units (Alathon 3165, sold by the DuPont Chemical Company). The copolymer film is manufactured by extruding a molten plastic tube or sheet to a wall thickness of, for example, 0.06 inch. The extruded plastic can then be electron-irradiated, and biaxially oriented by stretching in two perpendicular directions, to cause the tube or sheet to double its length in both perpendicular directions, and to assume a wall thickness of about 0.015 inch. This technique is generally described in U.S. Pat. No. 3,022,543.

Biaxial orientation of plastic film is in general a well known process, being generally described in The Encyclopedia of Polymer Science and Technology, Vol. 2 p.p. 339 to 373 (published by John Wiley) as well as in the other references cited in footnotes therein.

The irradiation increases the viscosity of the molten plastic, and improves the characteristics of the biaxially oriented film.

Thereafter, lengths of biaxially oriented film 12, 14 are R.F. sealed together at their respective peripheries 16 in a conventional manner, to produce sealed bag 10. Bag 10 may also be provided with a pair of sealed access ports 18, which pass through sealed periphery 16, and are each provided with an openable sterile seal member 20 of conventional design.

Vent 22 may be used to introduce nitrogen into the bag during the manufacturing, for the purpose of preventing adhesion of bag walls 12, 14 together at areas other than the periphery 16. Thereafter, vent 22 is sealed at its end 24.

Inlet tube 26 also passes through sealed periphery 16, for communication with the interior of the bag. Tube 26 communicates with a conventional branching adapter 28, to form a pair of branched tubes 30, 32. Branch tubes 30, 32 are each respectively flow-controlled by a roller clamp 34, 36 or the like, each branch tube terminating with a penetrating spike 38, 40. Each spike is closed from the exterior by a sterile seal member.

Accordingly, one branch tube 30 can be utilized to receive cells for freezing. At the same time, the other branch tube 32 can be connected with a source of glycerol, to permit the mixing in bag 10 of the cells for freezing with a desired amount of glycerol. Thereafter, tube 26 can be sealed with a heat sealing device, and the bag can then be stored at about −195° C. for freezing of the cells.

The bag of this invention exhibits a significantly increased impact strength at cryogenic temperatures, when compared with the commercially available blood cell freezing bags, so that rough handling of the frozen bags results in much less bag breakage, despite the low cryogenic temperatures which tend to make all plastics brittle.

When the blood is needed for use, it is thawed, with access to the cells being made through ports 18.

The following example is illustrates the improved impact strength of the flexible container described above at cryogenic temperatures, when compared with the commercially available Hemoflex blood cell freezing bags sold by The Union Carbide Company. The Hemoflex bags are made of biaxially oriented polyethylene, having a thickness of 0.002 to 0.004 inch. As stated above, the polyethylene freezer bags have considerably less wall thickness than the containers of this invention, because, with an equivalent wall thickness, they would be excessively rigid and accordingly unsuitable for the purposes of this invention.

The Hemoflex bags were compared with the containers specifically described above by subjection at −195° C. to a modified A.S.T.M. Dart Drop Test, which is generally similar to A.S.T.M. D 1709-67.

In the test an aluminum "dart," comprising a one and one half inch diameter solid hemisphere having a 0.25 inch diameter shaft connected to its flat surface, was dropped on frozen samples of material from the Hemoflex bags and on samples of ethylene vinyl acetate material used in the bags of this invention.

The ethylene vinyl acetate film samples were taken from material that had not yet been assembled into the bag configuration. The materials had, however, been electron irradiated and biaxially oriented to a sheet thickness of about 0.015 inch.

The samples were mounted in a restraining holder and positioned in a stainless steel container which had been cooled to −196° C. by liquid nitrogen. Immediately prior to test the samples were sprayed directly with liquid nitrogen so that at the time of impact a small amount of liquid nitrogen was on the surface of the sample.

The dart was dropped to strike the sample with its hemispherical face, from a height of 40.5 centimeters for the samples from the Hemoflex bags, and from a height of 80.5 centimeters for the samples of films used in the bags of this invention, described above. The weight of the darts used in the test was varied by adding washers to the shaft, to provide a variable weight of between 300 and 700 grams. The weight of dart necessary to cause sample rupture on fifty percent of the dart drops was noted. Then, the total impact energy of the dart which caused this fifty percent rupture rate was calculated.

Under the conditions of the above-described test, the calculated impact energy necessary to rupture 50 percent of the samples from the Hemoflex polyethylene bags was 2.4 joules. The calculated impact energy necessary to rupture 50 percent of the ethylene vinyl acetate samples was 4.7 joules.

Accordingly, it can be seen that the impact strength of the flexible containers of this invention can be much greater than the corresponding impact strength of the polyethylene containers of the prior art. Nevertheless, containers of this invention are flexible and easily collapsible, to permit the easy filling and collapsing at room temperature, for the convenient filling and complete emptying of the containers with a minimal loss of blood cells.

The above has been offered for illustrative purposes only, and it is not for the purpose of limiting the scope of this invention, which is as defined in the claims below.

That which is claimed is:

1. An improved, flexible, collapsible container, having improved physical strength at cryogenic temperatures, defining walls which consist essentially of a biaxially-oriented ethylene-vinyl acetate copolymer containing from 10 to 35 percent by weight of vinyl acetate units, in which said walls have a thickness of from 0.01 to 0.025 inch, said walls being sealed together by a radio frequency generated seal to define said container.

2. The container of claim 1 which is made from ethylene-vinyl acetate copolymer film which has been biaxially oriented by being stretched in two generally perpendicular directions to achieve at least a two-fold increase in dimension of said film in each said direction.

3. The container of claim 2 in which said copolymer contains from 15 to 25 percent by weight of vinyl acetate units.

4. The container of claim 3 in which said copolymer contains about 18 percent by weight of vinyl acetate units, and said walls are about 0.015 inch thick.

5. The container of claim 3 which comprises a pair of sheets of said copolymer, sealed together at their edges.

* * * * *